United States Patent
Hong

(10) Patent No.: US 12,096,298 B2
(45) Date of Patent: Sep. 17, 2024

(54) METHODS AND DEVICES FOR SENDING A SERVICE REQUEST TO OBTAIN TARGET INFORMATION

(71) Applicant: Beijing Xiaomi Mobile Software Co., Ltd., Beijing (CN)

(72) Inventor: Wei Hong, Beijing (CN)

(73) Assignee: Beijing Xiaomi Mobile Software Co., Ltd., Beijing (CN)

(*) Notice: Subject to any disclaimer, the term of this patent is extended or adjusted under 35 U.S.C. 154(b) by 313 days.

(21) Appl. No.: 17/629,691

(22) PCT Filed: Jul. 25, 2019

(86) PCT No.: PCT/CN2019/097783
§ 371 (c)(1),
(2) Date: Jan. 24, 2022

(87) PCT Pub. No.: WO2021/012280
PCT Pub. Date: Jan. 28, 2021

(65) Prior Publication Data
US 2022/0272593 A1    Aug. 25, 2022

(51) Int. Cl.
*H04W 36/08* (2009.01)
*H04W 36/00* (2009.01)

(52) U.S. Cl.
CPC ....... *H04W 36/08* (2013.01); *H04W 36/0061* (2013.01)

(58) Field of Classification Search
CPC ............ H04W 36/08; H04W 36/0061; H04W 36/083; H04W 36/00833; H04W 48/20; H04W 36/0069; H04W 36/00; H04W 36/30; H04W 64/00
See application file for complete search history.

(56) References Cited

U.S. PATENT DOCUMENTS

| 2015/0195757 | A1* | 7/2015 | Tietz | H04B 7/155 |
| | | | | 455/438 |
| 2018/0352508 | A1* | 12/2018 | Fujishiro | H04W 76/30 |
| 2019/0159074 | A1* | 5/2019 | Velev | H04W 36/305 |
| 2020/0288359 | A1* | 9/2020 | Kim | H04W 36/026 |
| 2021/0400746 | A1* | 12/2021 | Kuo | H04W 80/02 |

(Continued)

FOREIGN PATENT DOCUMENTS

| CN | 103686880 | * | 3/2014 |
| CN | 103686880 | A | 3/2014 |

(Continued)

*Primary Examiner* — Mewale A Ambaye
(74) *Attorney, Agent, or Firm* — Volpe Koenig

(57) ABSTRACT

An information obtaining method, applicable to a terminal. The method comprises: transmitting an obtaining request to a base station, wherein the obtaining request is used for requesting the base station to transmit target information; and receiving the target information that is transmitted by the base station according to the obtaining request. The base station can not only autonomously configure information for a terminal, but can also transmit the target information to the terminal according to the obtaining request of the terminal; the terminal not only passively receives the information configured by the base station, but also can actively obtain the target information from the base station by transmitting the obtaining request to the base station.

20 Claims, 5 Drawing Sheets

(56) References Cited

U.S. PATENT DOCUMENTS

2023/0007455 A1* 1/2023 Kuo .................... H04W 76/11
2023/0389094 A1* 11/2023 Pan .................... H04L 69/324
2024/0015619 A1* 1/2024 Pan .................... H04W 36/033

FOREIGN PATENT DOCUMENTS

CN          109714800 A     5/2019
WO          2014/012255 A1  1/2014

* cited by examiner

METHODS AND DEVICES FOR SENDING A SERVICE REQUEST TO OBTAIN TARGET INFORMATION

CROSS REFERENCE TO RELATED APPLICATION

The present application is a U.S. National Phase of International Patent Application Serial No. PCT/CN2019/097783 filed on Jul. 25, 2019. The entire contents of the above-cited application are hereby incorporated by reference in their entirety for all purposes.

BACKGROUND

In the related art, a terminal communicates with a base station in a mode that the base station configures information for the terminal and the terminal passively receives information, and the terminal can only request channel resources from the base station.

SUMMARY

The disclosure relates to the technical field of communication, and particularly to an information acquisition method, an information sending method, an information acquisition apparatus, an information sending apparatus, an electronic device and a computer-readable storage medium.

According to a first aspect of examples of the disclosure, an information acquisition method is proposed, suitable for a terminal, and the method includes:

sending an acquisition request, the acquisition request is used for requesting target information; and receiving the target information.

According to a second aspect of examples of the disclosure, an information sending method is proposed, suitable for a base station, and the method includes:

receiving an acquisition request;

determining target information according to the acquisition request; and sending the target information.

According to a third aspect of the examples of the disclosure, an electronic device is proposed, including:

a processor; and a memory for storing a processor executable instruction, the processor is configured to implement the information acquisition method of any one of the examples.

According to a fourth aspect of the examples of the disclosure, an electronic device is proposed, including:

a processor; and a memory for storing a processor executable instruction, the processor is configured to implement the information sending method of any one of the examples.

According to a fifth aspect of examples of the disclosure, a non-transitory computer-readable storage medium on which a computer program is stored is proposed, and when the program is executed by a processor, steps of the information acquisition method in any one of the examples are implemented.

According to a sixth aspect of an example of the disclosure, a non-transitory computer-readable storage medium on which a computer program is stored is proposed, and when the program is executed by a processor, steps of the information sending method in any one of the examples are implemented.

BRIEF DESCRIPTION OF DRAWINGS

In order to describe the technical solutions in the examples of the disclosure more clearly, the following briefly introduces the accompanying drawings referenced for describing the examples. Accordingly, the accompanying drawings in the following description show only some examples of the disclosure, and those of ordinary skill in the art may still derive other drawings from these drawings without any creative efforts.

DETAILED DESCRIPTION OF THE EXAMPLES

The technical solutions in the examples of the disclosure will be clearly and completely described below with reference to the accompanying drawings in the examples of the disclosure. Accordingly, the examples described are only some of the examples of the disclosure, not all of them. All other examples obtained by those of ordinary skill in the art based on the examples of the disclosure without any creative efforts shall fall within the protection scope of the disclosure.

In the related art, a terminal communicates with a base station in a mode that the base station configures information for the terminal and the terminal passively receives information, and the terminal can only request channel resources from the base station, thus greatly limiting the flexibility of communication between the terminal and the base station.

Figure 1:
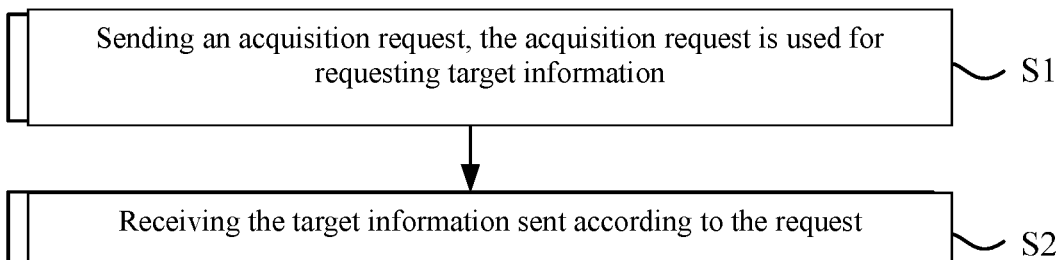
FIG. 1 shows a flow chart of an information acquisition method illustrated according to examples of the disclosure.

FIG. 1 is a flow chart of a method for information acquisition according to an example of the disclosure. The information acquisition method of the example may be applied to a terminal, the terminal may be an electronic device such as a cell phone, a tablet and a wearable device, and the terminal may be used as user equipment to communicate with a base station, for example, communicate based on 5G New Radio (NR).

As shown in FIG. 1, the information acquisition method may include the following steps:

S1, an acquisition request is sent, and the acquisition request is used for requesting target information; and S2, the target information sent according to the acquisition request is received.

In an example, a terminal can send an acquisition request to a base station, and the base station can determine target information that the terminal requests to acquire according to the acquisition request, and then send the target information to the terminal, whereby the terminal can receive the target information sent by the base station.

With increasing expansion of functions and growing processing power of the base station and the terminal, the base station and the terminal can process according to increasingly complex logic, and growing amounts of information. The base station may not be limited to autonomously configuring information for the terminal, but may also send target information to the terminal according to the acquisition request of the terminal, and the terminal likewise is not limited to passively receiving information configured by the base station, but may also actively acquire target information from the base station by sending the acquisition request to the terminal.

Accordingly, the terminal can conveniently send the acquisition request to the base station in real-time to acquire the target information when seeking to acquire the target information, and the terminal is facilitated to perform subsequent operations according to the acquired target information in real-time, i.e., without waiting for the base station to send the target information, so that the time delay for performing subsequent operations can be reduced.

Subsequent operations performed by the terminal according to the target information can be different based on the target information.

For example, the target information is information of multiple cells, and information of neighboring cells of the multiple cells. Subsequent operations performed by the terminal may be machine learning conducted according to the information of the multiple cells and the information of the neighboring cells of the multiple cells, to determine a cell reselection or handover model, whereby when in any cell subsequently, cell reselection or handover can be autonomously and rapidly completed according to the cell reselection or handover model obtained through learning.

For example, when the target information is information of one cell and information of a neighboring cell, subsequent operations performed by the terminal may include, when performing cell reselection or handover subsequently, determining whether the target cell is selected as a cell after reselection or handover.

It shall be noted that the target information is not limited to the information of the cell and the neighboring cells in the example, but may also contain paging signaling, system messages, etc. of other base stations.

In some embodiments, the target information includes a target location, and the acquisition request is used for requesting information of a target cell in the target location.

In an example, when the terminal needs to acquire information of the target cell, the target location may be carried in the acquisition request, and a base station can determine the target cell located at the target location, and then can acquire the information of the target cell.

The target location may be a single location, in which case the target cell located at the target location refers to a cell with a coverage area including the location, and the target location can also be a region including multiple locations, in which case the target cell located at the target location refers to a cell with a coverage area overlapping with the region by more than a preset overlap ratio.

For example, the base station can first determine the target base station corresponding to the target cell located at the target location. If a direct communication interface exists between the base station and the target base station, the information of the target cell can be acquired from the target base station through the interface and then sent to the terminal. If the base station cannot communicate with the target base station directly, a request can be sent to a core network through an interface of the core network to request the information of the target cell of the target base station, and then the information of the target cell from the core network can be sent to the terminal.

It shall be noted that the acquisition request may also carry other information for the base station to determine the target cell in addition to the target location for the base station to determine the target cell, for example, the identifier of the target cell may be carried by the acquisition request.

In some embodiments, the information of the target cell includes at least one of the following:

the load of the target cell, whether the target cell supports carrier aggregation or dual connectivity, the communication mode of the target cell, and the identifier of the target cell.

In an example, according to information such as the load of the target cell, whether the target cell supports carrier aggregation or dual connectivity, the communication mode of the target cell, and the identifier of the target cell, it can be determined whether the target cell is suitable for being used as a cell after reselection or handover in case of cell reselection or handover subsequently.

Figure 2:
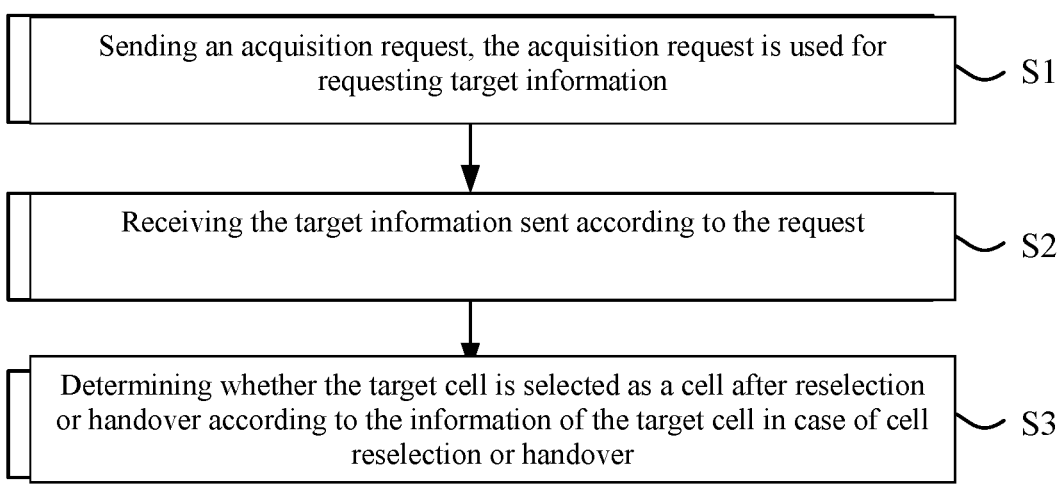
FIG. 2 shows a flow chart of another information acquisition method illustrated according to examples of the disclosure.

FIG. 2 is a flow chart of another method for information acquisition according to an example of the disclosure. As shown in FIG. 2, in addition to steps S1 and S2, the method further includes:

at S3, whether the target cell is selected as the cell after reselection or handover is determined according to the information of the target cell in case of cell reselection or handover.

In an example, after acquiring the information of the target cell, the terminal determines whether the target cell is selected as the cell after reselection or handover according to the information of the target cell in case of subsequent cell reselection or handover.

For example, the terminal is located in a cell A, and the target cell is a neighboring cell of the cell A. Since the terminal has acquired the information of the target cell before being located in the cell A, in case of cell reselection or handover in the cell A, the terminal does not need to acquire the information of the target cell again, but need only determine whether the target cell is selected as the cell after reselection or handover according to the information of the target cell.

For example, the information of the target cell includes the load of the target cell. If the load is large, e.g., greater than or equal to a preset load, it can be determined that the target cell is not selected as the cell after reselection or handover. On the other hand, if the load is small, e.g., less than the preset load, it can be determined that the target cell is selected as the cell after reselection or handover.

In some embodiments, the acquisition request is carried by access layer signaling.

In some embodiments, the access layer signaling includes at least one of the following:

Radio Resource Control (RRC) signaling, Media Access Control Control Element (MAC CE), Physical Uplink Control Channel (PUCCH) signaling.

Figure 3:
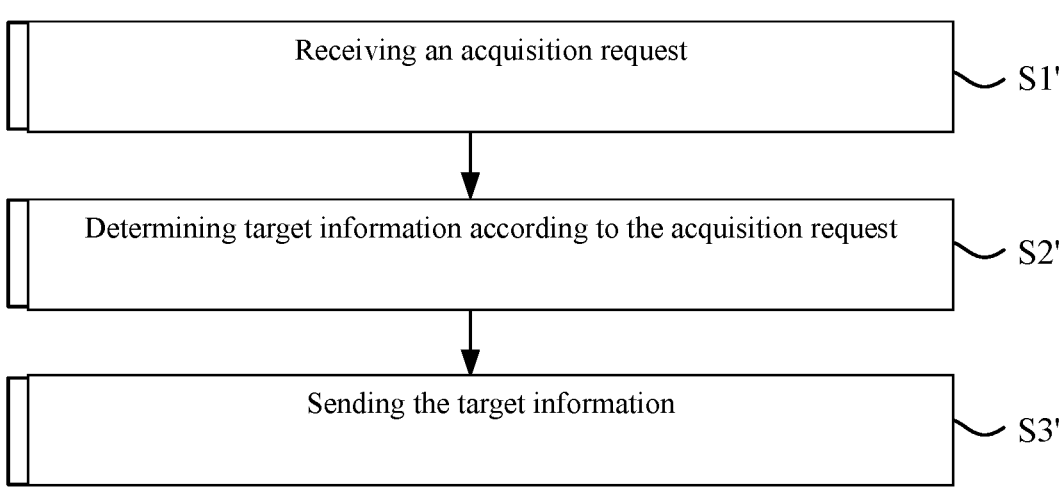
FIG. 3 shows a flow chart of an information sending method illustrated according to examples of the disclosure.

FIG. 3 shows a flow chart of an information sending method illustrated according to examples of the disclosure; The information sending method of the example may be applied to a base station, the base station may communicate with a terminal of any one of the examples, for example, communicate based on 5G NR.

As shown in FIG. 3, the information sending method may include the following steps:

S1', an acquisition request is received;

S2', target information is determined according to the acquisition request; and

S3', the target information is sent.

In an example, a terminal can send an acquisition request to a base station, and the base station can determine target information that the terminal needs to acquire according to the acquisition request, and then send the target information to the terminal, whereby the terminal can receive the target information sent by the base station.

The base station may not be limited to merely autonomously configuring information for the terminal, but may also send target information to the terminal according to the acquisition request of the terminal, and the terminal is likewise not limited to passively receiving information configured by the base station, but may actively acquire target information from the base station by sending the acquisition request to the base station.

Accordingly, the terminal can conveniently send the acquisition request to the base station substantially in real-time to acquire the target information when seeking to acquire the target information, and the terminal is facilitated to perform subsequent operations according to the acquired target information substantially in real-time, i.e., without waiting for the base station to send the target information, so that the time delay for performing subsequent operations can be reduced.

Figure 4:
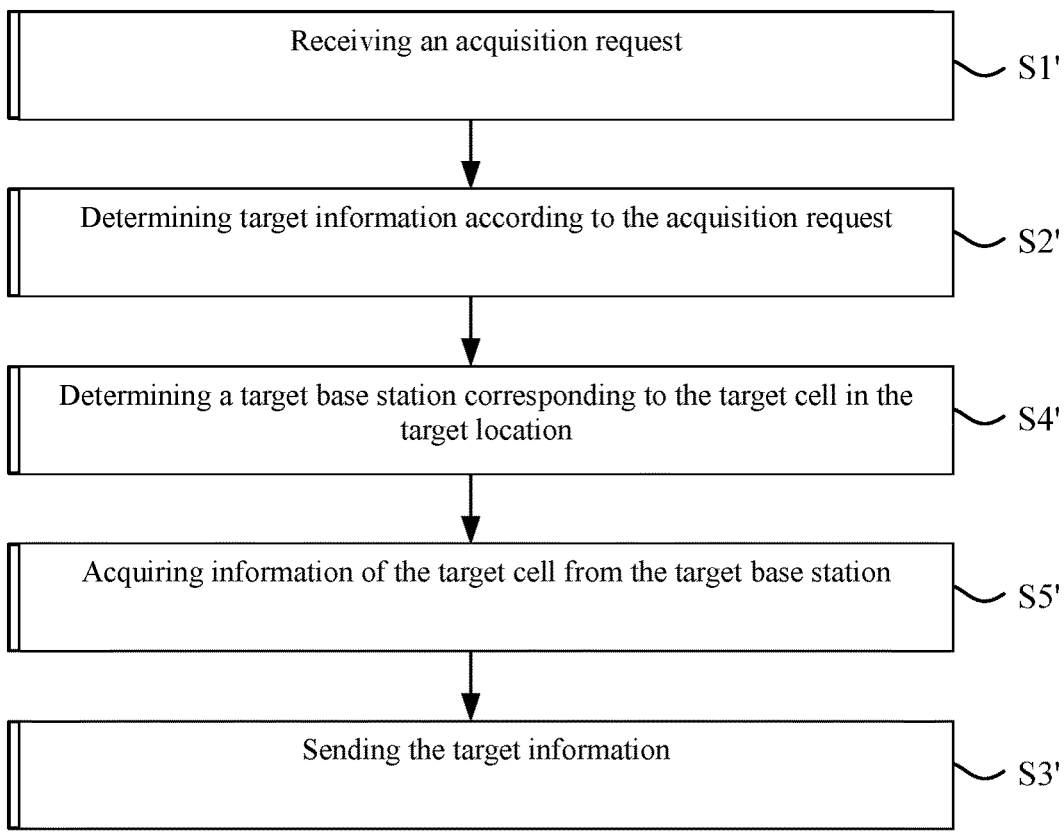
FIG. 4 shows a flow chart of another information sending method illustrated according to examples of the disclosure.

FIG. 4 shows a flow chart of another information sending method illustrated according to examples of the disclosure; As shown in FIG. 4, the target information includes information of a target cell, and the acquisition request includes a target location, and before sending the target information, the method further includes:

at S4', a target base station corresponding to the target cell in the target location is determined; and at S5', information of the target cell is acquired from the target base station.

In an example, when the terminal needs to acquire information of the target cell, a location of the target cell may be carried in the acquisition request, and a base station can determine the target cell according to the location, whereby the information of the target cell is acquired.

For example, the base station can first determine a target base station corresponding to the target cell according to the location of the target cell. If a direct communication interface exists between the base station and the target base station, the information of the target cell can be acquired from the target base station through the interface and then sent to the terminal.

Figure 5:
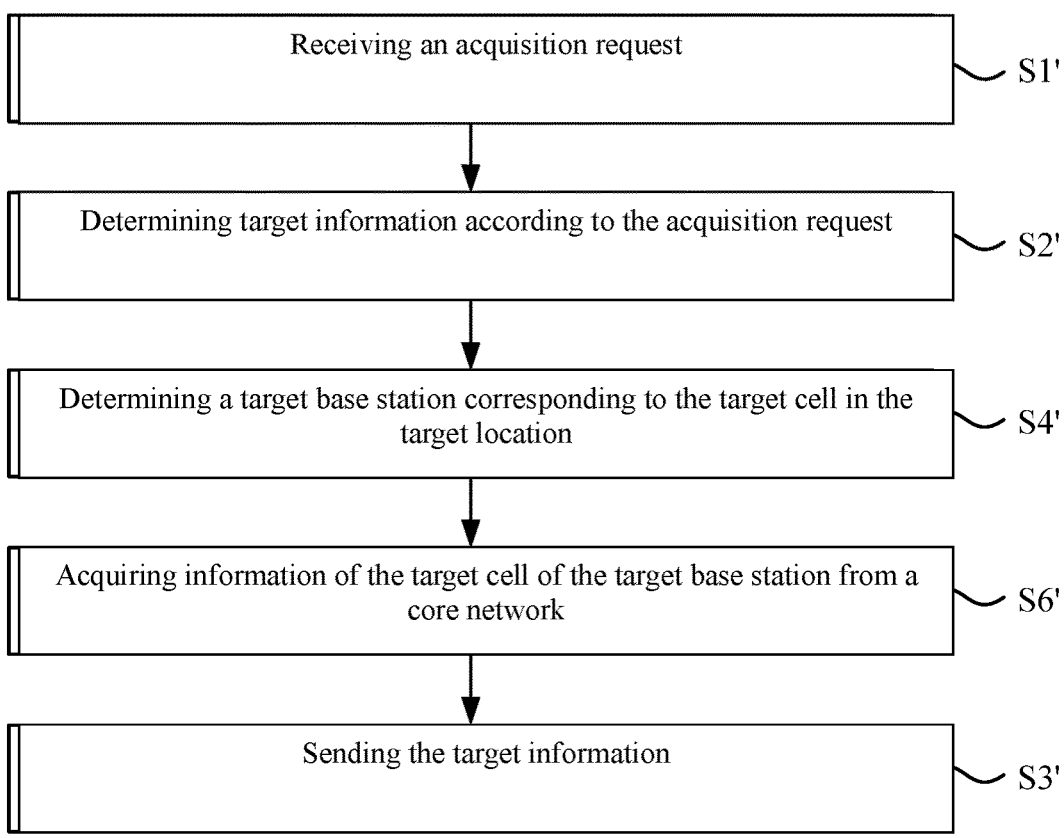
FIG. 5 shows a flow chart of another information sending method illustrated according to examples of the disclosure.

FIG. 5 shows a flow chart of another information sending method illustrated according to examples of the disclosure. In the method shown in FIG. 5, an acquisition request is received at S1' and target information is determined at S2', the target information includes information of a target cell, and the acquisition request includes a target location, and before sending the target information at S3', the method further includes:

at S4', a target base station corresponding to the target cell in the target location is determined; and at S6', information of the target cell of the target base station is acquired from a core network.

In an example, when the terminal needs to acquire information of the target cell, a location of the target cell may be carried in the acquisition request, and a base station can determine the target cell according to the location, whereby the information of the target cell is acquired.

For example, the base station can first determine the target base station corresponding to the target cell according to the location of the target cell. If the base station cannot communicate with the target base station directly, a request can be sent to a core network through an interface of the core network to request the information of the target cell of the target base station, and then the information of the target cell received from the core network can be sent to the terminal.

In some embodiments, the target information is carried by access layer signaling.

In some embodiments, the access layer signaling includes at least one of the following:

RRC signaling, MAC CE, and PDCCH signaling.

Corresponding to examples of the information acquisition method and the information sending method, the disclosure further provides examples of an information acquisition apparatus and an information sending apparatus.

Figure 6:
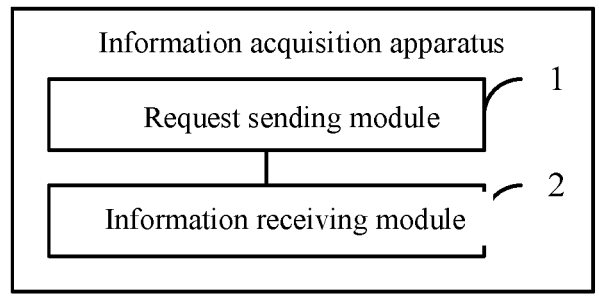
FIG. 6 shows a schematic block diagram of an information acquisition apparatus illustrated according to examples of the disclosure.

FIG. 6 shows a schematic block diagram of an information acquisition apparatus according to examples of the disclosure; the information acquisition apparatus of the example may be applied to a terminal, the terminal may be an electronic device such as a cell phone, a tablet and a wearable device, and the terminal may be used as user equipment to communicate with a base station, for example, communicate based on 5G New Radio (NR).

As shown in FIG. 6, the information acquisition apparatus includes:

a request sending module 1, configured to send an acquisition request to a base station, the acquisition request is used for requesting the base station to send target information; and an information receiving module 2, configured to receive the target information sent by the base station according to the acquisition request.

In some embodiments, the target information includes information of a target cell, the acquisition request includes a target location, and the acquisition request is used for requesting information of a target cell in the target location.

In some embodiments, the information of the target cell includes at least one of the following:

the load of the target cell, whether the target cell supports carrier aggregation or dual connectivity, the communication mode of the target cell, and the identifier of the target cell.

Figure 7:
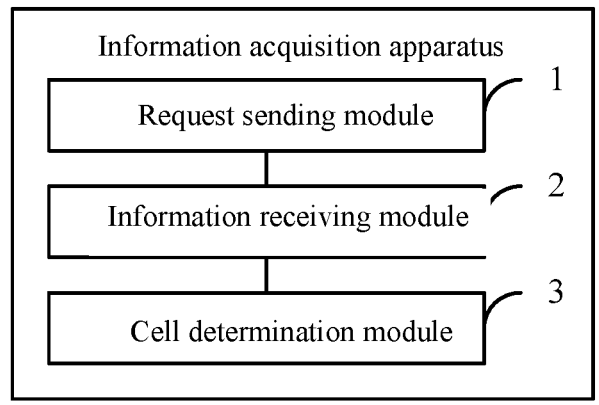
FIG. 7 shows a schematic block diagram of another information acquisition apparatus illustrated according to examples of the disclosure.

FIG. 7 shows a schematic block diagram of another information acquisition apparatus illustrated according to examples of the disclosure; as shown in FIG. 7, the apparatus further includes:

a cell determination module 3, configured to determine whether the target cell is selected as a cell after reselection or handover according to the information of the target cell in case of cell reselection or handover.

In some embodiments, the acquisition request is carried by access layer signaling.

In some embodiments, the access layer signaling includes at least one of the following:

RRC signaling, MAC CE, and PUCCH signaling.

Figure 8:
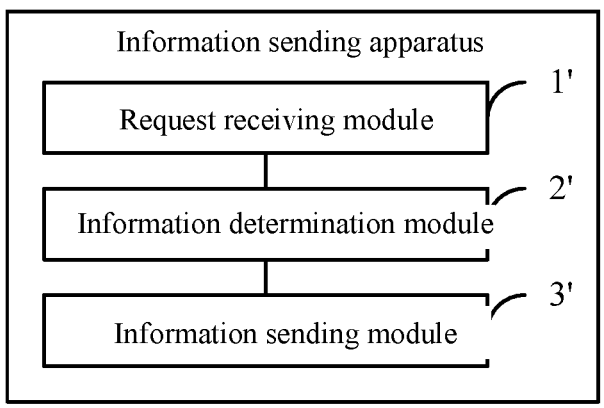
FIG. 8 shows a schematic block diagram of an information sending apparatus illustrated according to examples of the disclosure.

FIG. 8 shows a schematic block diagram of an information sending apparatus illustrated according to examples of the disclosure; the information sending apparatus of the example may be applied to a base station, the base station may communicate with a terminal of any one of the examples, for example, communicate based on 5G NR.

As shown in FIG. 8, the information sending apparatus may include:

a request receiving module 1', configured to receive an acquisition request;

an information determination module 2', configured to determine target information according to the acquisition request; and an information sending module 3', configured to send the target information.

Figure 9:
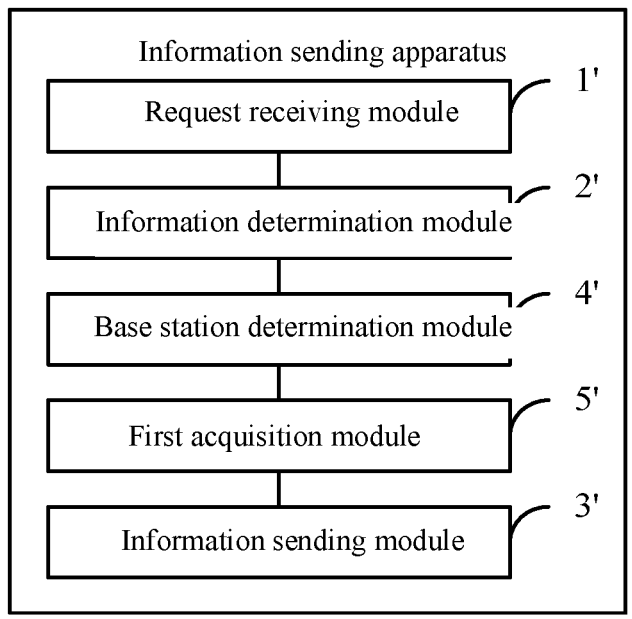
FIG. 9 shows a schematic block diagram of another information sending apparatus illustrated according to examples of the disclosure.

FIG. 9 shows a schematic block diagram of another information sending apparatus illustrated according to examples of the disclosure; as shown in FIG. 9, the target information includes information of a target cell, and the acquisition request includes a target location, and the apparatus further includes:

a base station determination module 4', configured to determine a target base station corresponding to the target cell in the target location; and a first acquisition module 5', configured to acquire information of the target cell from the target base station.

Figure 10:
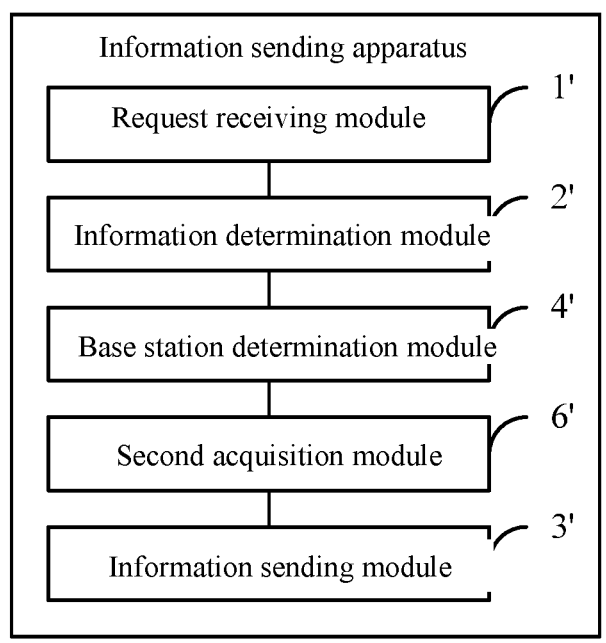
FIG. 10 shows a schematic block diagram of another information sending apparatus illustrated according to examples of the disclosure.

FIG. 10 shows a schematic block diagram of another information sending apparatus illustrated according to examples of the disclosure; as shown in FIG. 10, the target information includes information of a target cell, and the acquisition request includes a target location, and the apparatus further includes:

a base station determination module 4', configured to determine a target base station corresponding to the target cell in the target location; and a second acquisition module 6', configured to acquire information of the target cell of the target base station from a core network.

In some embodiments, the target information is carried by access layer signaling.

In some embodiments, the access layer signaling includes at least one of the following:

RRC signaling, MAC CE, and PDCCH signaling.

With regard to the apparatuses in the above examples, the specific manner in which the respective modules perform their operations have been described in detail in the examples relating to the methods, and details are not repeated herein.

The apparatus examples substantially correspond to the method examples, so reference may be made to the descriptions of the method examples. The apparatus examples described above are merely representative, the modules illustrated as separate components may be or may not be physically separated, and the components displayed as modules may be or may not be physically distributed modules, that is, the components may be positioned at one place or may also be distributed on a plurality of network modules. Some or all of the modules may be selected according to actual needs to achieve the objectives of the solutions of the examples. Those of ordinary skill in the art, upon reading this disclosure can understand and implement the teachings herein without any creative effort and without undue experimentation.

The examples of the disclosure further disclose an electronic device, including:

a processor; and a memory for storing processor executable instructions by which the processor is configured to implement the information acquisition method of any one of the examples.

The examples of disclosure further proposes an electronic device, including:

a processor; and a memory for storing processor executable instructions, by which the processor is configured to implement the information sending method of any one of the examples.

Examples of the disclosure further disclose a computer-readable storage medium on which a computer program is stored, and when the program is executed by a processor, steps of the information acquisition method in any one of the examples are implemented.

Examples of the disclosure further disclose a computer-readable storage medium on which a computer program is stored, and when the program is executed by a processor, steps of the information sending method in any one of the examples are implemented.

Figure 11:
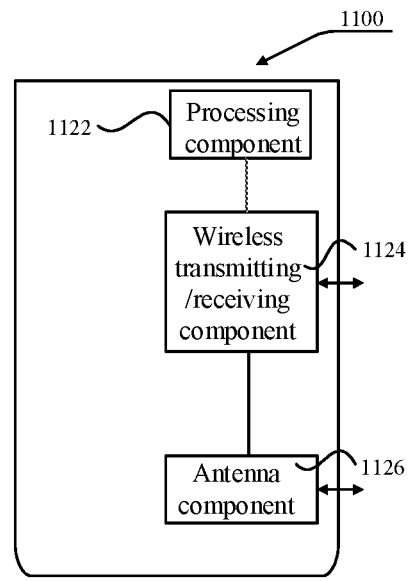
FIG. 11 shows a schematic diagram of an information sending apparatus illustrated according to examples of the disclosure.

As shown in FIG. 11, FIG. 11 shows a schematic diagram of an information sending apparatus 1100 illustrated according to examples of the disclosure. The apparatus 1100 may be provided as a base station. Referring to FIG. 11, the apparatus 1100 includes a processing component 1122, a wireless transmitting/receiving component 1124, an antenna component 1126, and a signal processing part (not shown) specific to a wireless interface. The processing component 1122 may further include one or more processors. One or more processors of the processing component 1122 may be configured to implement the information sending method of any one of the examples.

Figure 12:
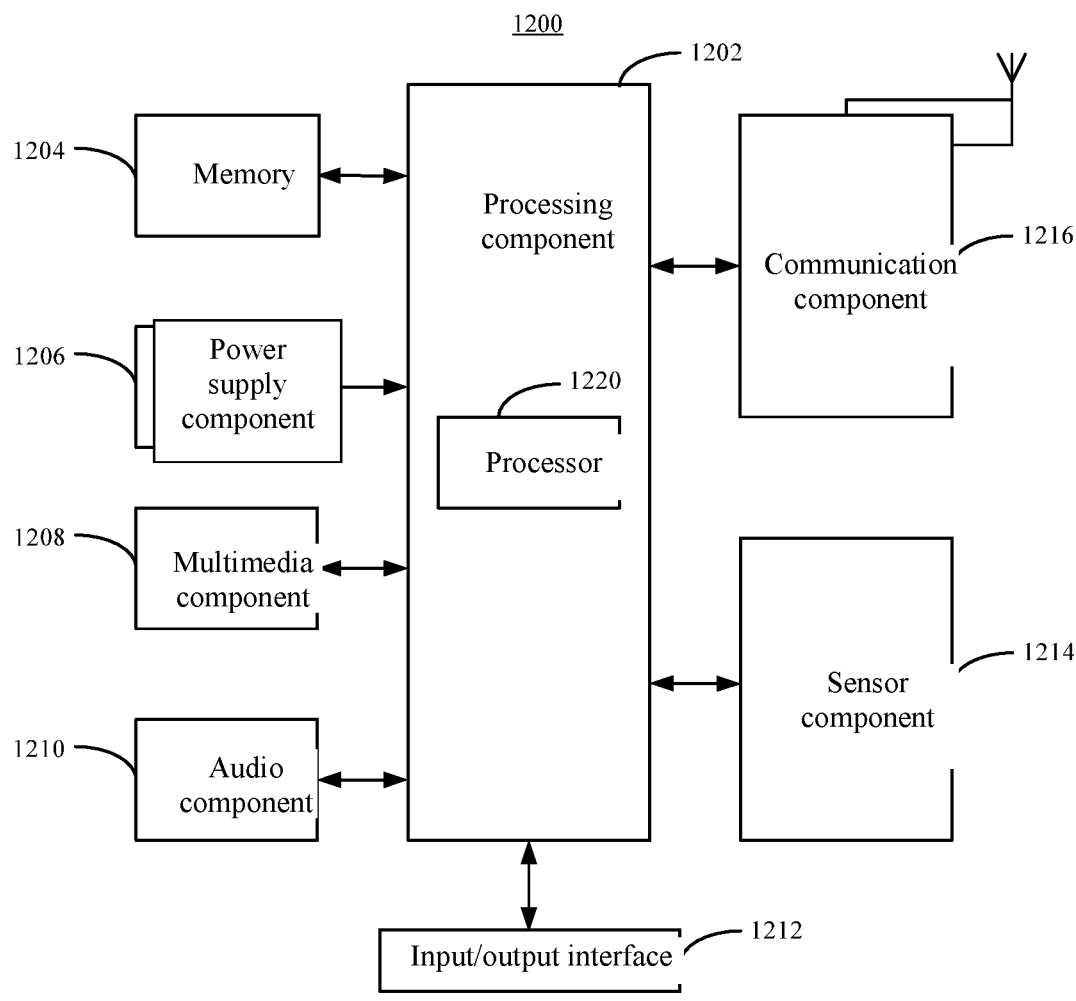
FIG. 12 shows a schematic diagram of an information acquisition apparatus illustrated according to examples of the disclosure.

FIG. 12 is a schematic block diagram of an apparatus 1200 for information acquisition according to an example of the disclosure. For example, the apparatus 1200 can be a cell phone, a computer, a digital broadcast terminal, a message sending and receiving device, a game console, a tablet device, a medical device, a fitness device, a personal digital assistant, etc.

Referring to FIG. 12, the apparatus 1200 may include one or more of the following components: a processing component 1202, a memory 1204, a power component 1206, a multimedia component 1208, an audio component 1210, an Input/Output (I/O) interface 1212, a sensor component 1214, and a communication component 1216.

The processing component 1202 generally controls overall operations of the apparatus 1200, such as operations associated with display, telephone calls, data communication, camera operations, and recording operations. The processing assembly 1202 may include one or more processors 1220 to execute instructions to accomplish all or part of the steps of the information acquisition method. In addition, the processing component 1202 may include one or more modules that facilitate processing of interactions between the processing component 1202 and other components. For example, the processing component 1202 may include a multimedia module to facilitate interactions between a multimedia component 1208 and the processing component 1202.

The memory 1204 is configured to store various types of data to support operations of the apparatus 1200. Examples of such data include instructions for any application or method operating on the apparatus 1200, contact data, phonebook data, messages, pictures, videos, etc. The memory 1204 may be implemented by any type of volatile or non-volatile storage device or a combination of them, such as Static Random Access Memory (SRAM), Electrically Erasable Programmable Read-Only Memory (EE- PROM), Erasable Programmable Read-Only Memory (EPROM), Programmable Read-Only Memory (PROM), Read-Only Memory (ROM), magnetic memory, flash memory, magnetic disk or optical disk.

A power supply component 1206 provides power for various components of the apparatus 1200. The power supply assembly 1206 may include a power management system, one or more power supplies, and other components associated with generating, managing and distributing power for the apparatus 1200.

The multimedia component 1208 includes a screen providing an output interface between the apparatus 1200 and a user. In some examples, the screen may include a Liquid Crystal Display (LCD) and a Touch Panel (TP). If the screen includes a touch panel, the screen may be implemented as a touch screen to receive input signals from the user. The touch panel includes one or more touch sensors to sense touches, slides and gestures on the touch panel. The touch sensor may sense not only the boundary of the touch or slide, but also the duration and pressure associated with the touch or slide. In some examples, the multimedia component 1208 includes a front camera and/or a rear camera. When the apparatus 1200 is in an operating mode, such as shooting mode or video mode, the front camera and/or rear camera can receive external multimedia data. Each front or rear camera may be a fixed optical lens system or have focal length and optical zoom capability.

An audio component 1210 is configured to output and/or input an audio signal. For example, the audio component 1210 includes a Microphone (MIC), and the microphone is configured to receive external audio signals when the apparatus 1200 is in operating modes, such as call mode, record mode and voice recognition mode. A received audio signal may be further stored in the memory 1204 or sent through the communication component 1216. In some examples, the audio component 1210 also includes at least one loudspeaker, used to output audio signals.

The I/O interface 1212 provides an interface between the processing component 1202 and peripheral interface modules, and the peripheral interface modules may be a keyboard, a click wheel, a button, etc. The button may include but is not limited to a home button, a volume button, a start button and a lock button.

The sensor component 1214 includes one or more sensors, used to provide state evaluation on various aspects for the apparatus 1200. For example, the sensor component 1214 may detect an open/closed state of the apparatus 1200 and the relative positioning of a component, for example, the component is a display and keypad of the apparatus 1200. The sensor component 1214 may also detect a position change of the apparatus 1200 or a component of the apparatus 1200, the presence or absence of contact of the user with the apparatus 1200, orientation or acceleration/deceleration of the apparatus 1200 and a temperature change of the apparatus 1200. The sensor component 1214 may include a proximity sensor, configured to detect the presence of a nearby object in the absence of any physical contact. The sensor component 1214 may also include a light sensor, such as a CMOS or CCD image sensor, for use in imaging applications. In some examples, the sensor component 1214 may also include an acceleration sensor, a gyroscope sensor, a magnetic sensor, a pressure sensor or a temperature sensor.

The communication component 1216 is configured to facilitate wired or wireless communication between the apparatus 1200 and other devices. The apparatus 1200 can access wireless networks based on communication standards such as WiFi, 2G or 3G, 4G LTE, 5G NR or a combination of them. In an example, the communication component 1216 receives broadcast signals or broadcast-related information from an external broadcast management system via a broadcast channel. In an example, the communication component 1216 also includes a NFC (Near-field Communication) module to facilitate short-range communication. For example, the NFC module can be implemented based on Radio Frequency Identification (RFID) technology, Infrared Data Association (IrDA) technology, Ultra Wide Band (UWB) technology, Bluetooth (BT) technology and other technologies.

In an example, the apparatus 1200 may be implemented by one or more of Application Specific Integrated Circuit (ASIC), Digital Signal Processor (DSP), Digital Signal Processing Device (DSPD), Programmable Logic Device (PLD), Field Programmable Gate Array (FPGA), controller, microcontroller, microprocessor or other electronic components, and is used to execute the information acquisition method of any one of the examples.

In an example, a non-transitory computer-readable storage medium including instructions is further provided, such as a memory 1204 including instructions, and the instructions may be executed by the processor 1220 of the apparatus 1200 to accomplish the information acquisition method. For example, the non-transitory computer readable storage media may be ROM, Random Access Memory (RAM), CD-ROM, magnetic tape, floppy disk, optical data storage device, etc.

Those skilled in the art would readily conceive of other examples of the disclosure after considering the specification and appreciating the disclosure herein. The disclosure is intended to cover any variations, uses or adaptive changes of the disclosure. These variations, uses or adaptive changes follow the general principle of the disclosure and include common general knowledge or conventional technical means in the technical field that are not disclosed in the disclosure. The description and the examples are merely regarded as exemplary, and the real scope and spirit of the disclosure are pointed out by the following claims.

It shall be understood that the disclosure is not limited to the precise structure described above and shown in the drawings, and various modifications and changes can be made without departing from its scope. The scope of the disclosure is only limited by the appended claims.

It shall be noted that the relational terms herein such as first and second are used only to differentiate an entity or operation from another entity or operation, and do not require or imply any actual relationship or sequence between these entities or operations. Term "include," "comprise," or any other variation is intended to cover non-exclusive inclusion, so that a process, method, article, or device including a set of elements includes not only those elements, but also other elements not expressly listed, or elements inherent to such process, method, article, or device. Without further limitation, elements defined by the statement "including a" do not preclude the existence of additional identical elements in the process, method, article or device including the elements.

The methods and apparatuses provided by the examples of the disclosure are described in detail above. Specific examples are used herein to illustrate the principles and provide practical implementations of the disclosure. The descriptions of the above examples are only used to help understanding the method and core idea of the disclosure. In addition, changes may be made to the specific examples and the application scope according to the idea of the disclosure for a person skilled in the art. To sum up, the content of the specification shall not be understood as limitations to the disclosure.

What is claimed is:

1. An information acquisition method, performed by a terminal, comprising:
   sending an acquisition request, wherein the acquisition request is used for requesting target information; and
   receiving the target information, wherein the target information comprises information of multiple cells and information of neighboring cells of the multiple cells, and the multiple cells at least include cells other than the cell where the terminal is located;
   conducting machine learning according to the information of the multiple cells and the information of the neighboring cells of the multiple cells to determine a cell reselection or handover model, whereby when in any cell subsequently, cell reselection or handover can be autonomously completed according to the cell reselection or handover model obtained through learning.

2. The method according to claim 1, wherein the target information comprises information of a target cell, the acquisition request comprises a target location, and the acquisition request is used for requesting information of a target cell in the target location.

3. The method according to claim 2, wherein the information of the target cell comprises at least one of the following:
   the load of the target cell, whether the target cell supports carrier aggregation or dual connectivity, the communication mode of the target cell, and the identifier of the target cell.

4. The method according to claim 2, wherein the method further comprises:
   determining whether the target cell is selected as a cell after reselection or handover according to the information of the target cell in case of cell reselection or handover.

5. The method according to claim 1, wherein the acquisition request is carried by access layer signaling.

6. The method according to claim 5, wherein the access layer signaling comprises at least one of the following:
   Radio Resource Control (RRC) signaling, Media Access Control Control Element (MAC CE), or Physical Uplink Control Channel (PUCCH) signaling.

7. An information sending method, performed by a base station, comprising:
   receiving an acquisition request sent by a terminal;
   determining target information according to the acquisition request, wherein the target information comprises information of multiple cells and information of neighboring cells of the multiple cells, and the multiple cells at least include cells other than the cell where the terminal is located; and
   sending the target information to enable the terminal to conduct machine learning according to the information of the multiple cells and the information of the neighboring cells of the multiple cells to determine a cell reselection or handover model, whereby when in any cell subsequently, cell reselection or handover can be autonomously completed according to the cell reselection or handover model obtained through learning.

8. The method according to claim 7, wherein the target information comprises information of a target cell, the acquisition request includes a target location, and before sending the target information, the method further comprises:
   determining a target base station corresponding to the target cell in the target location; and
   acquiring information of the target cell from the target base station.

9. The method according to claim 7, wherein the target information comprises information of a target cell, the acquisition request includes a target location, and before sending the target information, the method further comprises:
   determining a target base station corresponding to the target cell in the target location; and
   acquiring information of the target cell of the target base station from a core network.

10. The method according to claim 7, wherein the target information is carried by access layer signaling.

11. The method according to claim 10, wherein the access layer signaling comprises at least one of the following:
    Radio Resource Control (RRC) signaling, Media Access Control Control Element (MAC CE), or Physical Uplink Control Channel (PUCCH) signaling.

12. An electronic device, comprising:
    a processor; and
    a memory for storing a processor executable instruction, the processor is configured to:
    send an acquisition request, wherein the acquisition request is used for requesting target information; and
    receive the target information, wherein the target information comprises information of multiple cells and information of neighboring cells of the multiple cells, and the multiple cells at least include cells other than the cell where the terminal is located;
    conduct machine learning according to the information of the multiple cells and the information of the neighboring cells of the multiple cells to determine a cell reselection or handover model, whereby when in any cell subsequently, cell reselection or handover can be autonomously completed according to the cell reselection or handover model obtained through learning.

13. An electronic device, comprising:
    a processor; and
    a memory for storing a processor executable instruction, the processor is configured to implement the steps of -the information sending method according to claim 7.

14. A non-transitory computer-readable storage medium on which a computer program is stored, wherein when the program is executed by a processor, steps of the information acquisition method according to claim 1 are implemented.

15. A non-transitory computer-readable storage medium on which a computer program is stored, wherein when the program is executed by a processor, steps of the information sending method according to claim 7 are implemented.

16. The electronic device according to claim 12, wherein the target information comprises information of a target cell, the acquisition request comprises a target location, and the acquisition request is used for requesting information of a target cell in the target location.

17. The electronic device according to claim 16, wherein the information of the target cell comprises at least one of the following:
    the load of the target cell, whether the target cell supports carrier aggregation or dual connectivity, the communication mode of the target cell, and the identifier of the target cell.

18. The electronic device according to claim 16, wherein the processor is further configured to:

determine whether the target cell is selected as a cell after reselection or handover according to the information of the target cell in case of cell reselection or handover.

19. The electronic device according to claim 12, wherein the acquisition request is carried by access layer signaling.

20. The electronic device according to claim 19, wherein the access layer signaling comprises at least one of the following:
Radio Resource Control (RRC) signaling, Media Access Control Control Element (MAC CE), or Physical Uplink Control Channel (PUCCH) signaling.

* * * * *